(12) United States Patent
Chang et al.

(10) Patent No.: US 10,628,627 B2
(45) Date of Patent: Apr. 21, 2020

(54) THERMAL ESTIMATION DEVICE AND THERMAL ESTIMATION METHOD

(71) Applicants: Yeong-Jar Chang, Zhubei (TW); Ya-Ting Shyu, Kaohsiung (TW); Juin-Ming Lu, Hsinchu (TW); Yao-Hua Chen, Fangyuan Township, Changhua County (TW); Yen-Fu Chang, Taoyuan (TW); Jai-Ming Lin, Tainan (TW)

(72) Inventors: Yeong-Jar Chang, Zhubei (TW); Ya-Ting Shyu, Kaohsiung (TW); Juin-Ming Lu, Hsinchu (TW); Yao-Hua Chen, Fangyuan Township, Changhua County (TW); Yen-Fu Chang, Taoyuan (TW); Jai-Ming Lin, Tainan (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 180 days.

(21) Appl. No.: 15/857,156

(22) Filed: Dec. 28, 2017

(65) Prior Publication Data

US 2019/0147135 A1    May 16, 2019

(30) Foreign Application Priority Data

Nov. 15, 2017   (TW) .............................. 106139440 A

(51) Int. Cl.
*G06F 30/398*    (2020.01)
*G06F 30/30*    (2020.01)
(Continued)

(52) U.S. Cl.
CPC ............ *G06F 30/398* (2020.01); *G06F 30/30* (2020.01); *G06F 30/367* (2020.01); *G06F 2119/06* (2020.01); *G06F 2119/08* (2020.01)

(58) Field of Classification Search
USPC ........................................................ 716/110
See application file for complete search history.

(56) References Cited

U.S. PATENT DOCUMENTS 8,286,111 B2   10/2012  Chandra et al.
8,527,918 B2    9/2013  Cheng
(Continued)

FOREIGN PATENT DOCUMENTS

CN      101360983 A      2/2009
CN      103180853 A      6/2013
(Continued)

OTHER PUBLICATIONS

Han, Yongkui, et al., "Temperature Aware Floorplanning," Second Workshop on Temperature-Aware Computer Systems (TACS-2), held in conjuction with ISCA-32, Jun. 2005, 9 pgs. Madison, WI.
(Continued)

*Primary Examiner* — Mohammed Alam
(74) *Attorney, Agent, or Firm* — Muncy, Geissler, Olds & Lowe, P.C.

(57) ABSTRACT

An embodiment of a thermal estimation device including a temperature model generator, a temperature gradient calculator, and a thermal sensing analyzer is disclosed. The temperature model generator generates a temperature model based on an initial power consumption, an initial area and an initial coordination of a circuit module. The temperature gradient calculator substitutes at least one of a testing area, a testing power or a testing coordinate of the circuit module into the temperature model for correspondingly estimating an temperature estimation function. The thermal sensing analyzer differentiates the temperature estimation function. When an absolute value of a differential result of the
(Continued)

temperature estimation function resulted from a constant is closest to zero or is zero, outputting the constant as an optimized parameter.

22 Claims, 5 Drawing Sheets

(51) Int. Cl.
　　　*G06F 30/367*　　　(2020.01)
　　　*G06F 119/06*　　　(2020.01)
　　　*G06F 119/08*　　　(2020.01)

(56) References Cited

U.S. PATENT DOCUMENTS

| | | | |
|---|---|---|---|
| 8,826,208 | B1 | 9/2014 | Saha et al. |
| 8,898,608 | B1 | 11/2014 | Chuang et al. |
| 9,323,870 | B2 | 4/2016 | Chandra |
| 2007/0252633 | A1* | 11/2007 | Frankel .............. G01D 1/10 327/335 |
| 2009/0019411 | A1* | 1/2009 | Chandra ............ G06F 17/5009 716/119 |
| 2009/0024969 | A1 | 1/2009 | Chandra |
| 2009/0199140 | A1 | 8/2009 | Kariat et al. |
| 2009/0299543 | A1* | 12/2009 | Cox ................... G06F 1/203 700/299 |
| 2010/0235799 | A1 | 9/2010 | Rice et al. |
| 2013/0167103 | A1 | 6/2013 | Burrell et al. |
| 2013/0286595 | A1 | 10/2013 | Lisk et al. |
| 2015/0103866 | A1* | 4/2015 | Samadi ............... G01K 7/427 374/170 |
| 2019/0147135 | A1* | 5/2019 | Chang ............. G06F 17/5081 716/110 |

FOREIGN PATENT DOCUMENTS

| | | |
|---|---|---|
| CN | 103714384 A | 4/2014 |
| CN | 103793561 A | 5/2014 |
| CN | 103984828 A | 8/2014 |
| CN | 104021260 A | 9/2014 |
| CN | 105740495 A | 7/2016 |
| CN | 106294922 A | 1/2017 |
| CN | 106599428 A | 4/2017 |
| JP | 2016-183899 A | 10/2016 |
| TW | I371683 B | 9/2012 |
| TW | 20166268 | 7/2016 |

OTHER PUBLICATIONS

Hung, W-L., et al., "Thermal-Aware Floorplanning Using Genetic Algorithms," The Pennsylvania State University, Proceedings of the Sixth International Symposium on Quality Electronic Design (ISQED'05), Mar. 2005, 6 pgs., 0-7695-2301-3/05, IEEE Computer Society, University Park, PA.

Zhou, Xiuyi, et al., "Thermal-Aware Task Scheduling for 3D Multicore Processors," IEEE Transactions on Parallel and Distributed Systems, Jan. 2010, pp. 60-71, vol. 21, No. 1, IEEE Computer Society.

Huang, Yong-Ruei, et al., "Thermal-Aware Router-Sharing Architecture for 3D Network-on-Chip Designs," Graduate Institute of Electronics Engineering, National Taiwan University, 2010, pp. 1087-1090, 978-1-4244-7456-1/10, IEEE, Taipei, Taiwan.

Thiele, Lothar, et al., "Thermal-Aware System Analysis and Software Synthesis for Embedded Multi-Processors," Computer Engineering and Networks Laboratory, ETH Zurich, Jun. 5-10, 2011, pp. 268-273, 16.3 ACM 978-1-4503-0636-2/11/06, DAC'11, San Diego, CA.

Zhang, H.Y., et al., "Thermal Design Considerations in System Level Testing of Electronic Devices," Advanced Micro Devices Singapore, 11$^{th}$ International Conference on Electronic Packaging Technology & High Density Packaging, 2010, pp. 718-723, 978-1-4244-8142-2/10, IEEE.

Lung, Chiao-Ling, et al., "Thermal Analysis Experiences of a Tri-Core SoC System," National Tsing Hua University, Depts. of Computer Science and of Electrical Engineering, and Information and Communications Lab., Industrial Technology Research Institute, 2010, pp. 589-594, 978-1-4244-6878-2/10, IEEE.

Zhan, Yong, et al., "High-Efficiency Green Function-Based Thermal Simulation Algorithms," IEEE Transactions on Computer-Aided Design of Integrated Circuits and Systems, Sep. 2007, pp. 1661-1675, vol. 26, No. 9, IEEE.

Huang, Pei-Yu, et al., "Full-Chip Thermal Analysis for the Early Design Stage via Generalized Integral Transforms," IEEE Transactions on Very Large Scale Integration (VLSI) Systems, May 2009, pp. 613-626, vol. 17, No. 5, IEEE.

Asghari, Tony A., "A Transient Thermal Analysis Using a Simplified Heat Transfer Coefficient Model," 2001 International Symposium on Advanced Packaging Materials, Northbrook, IL, pp. 366-371.

Sabry, Mohamed-Nabil, et al., "Realistic and Efficient Simulation of Electro-Thermal Effects in VLSI Circuits," IEEE Transactions on Very Large Scale Integration (VLSI) Systems, Sep. 1997, pp. 283-289, vol. 5, No. 3, IEEE.

Ziabari, Amirkoushyar, et al., "Power Blurring: Fast Static and Transient Thermal Analysis Method for Packaged Integrated Circuits and Power Devices," IEEE Transactions on Very Large Scale Integration (VLSI) Systems, Nov. 2014, pp. 2366-2379, vol. 22, No. 11, IEEE.

Gupta, Aseem, et al., "STEFAL: A System Level Temperature- and Floorplan-Aware Leakage Power Estimator for SoCs," 20$^{th}$ International Conference on VLSI Design (VLSID'07), 6 pgs., 2007, 0-7695-2762-0/07, IEEE.

Han, Yongkui, et al., "Temperature Aware Floorplanning," Dept. of Electrical and Computer Engineering, University of Massachusetts, Amherst, MA, 9 pgs.

Kahng, Andrew B., et al., "Analytical Thermal Placement for VLSI Lifetime Improvement and Minimum Performance Variation," CSE Depts., UC San Diego and UC Santa Cruz, CA, 2007, pp. 71-77, IEEE, California.

Liu, Sean Shih-Ying, et al., "Fast Thermal Aware Placement with Accurate Thermal Analysis Based on Green Function," IEEE Transactions on Very Large Scale Integration (VLSI) Systems, Jun. 2014, pp. 1404-1415, vol. 22, No. 6, IEEE.

Xiao, Linfu, et al., "Fixed-outline Thermal-aware 3D Floorplanning," Dept. of CSE, The Chinese University of Hong Kong, et al., 2010, pp. 561-567, 7A-3 978-1-4244-5767-0/10, IEEE.

\* cited by examiner

THERMAL ESTIMATION DEVICE AND THERMAL ESTIMATION METHOD

This application claims the benefit of Taiwan application Serial No. 106139440, filed Nov. 15, 2017, the subject matter of which is incorporated herein by reference.

TECHNICAL FIELD

The present disclosure relates to a thermal estimation device and a thermal estimation method.

BACKGROUND

With the development of the industries such as mobile computation, high-performance computing devices, wearable devices, and automotive devices, these industries begin to apply complex chips. In addition, in order to satisfy the demand of the market, circuit board or system on chip (SoC) must be added with more functions. When more functions are to be implemented in the system, more circuit modules will be added to, thus the circuit design complexity is increased. Moreover, as the process for manufacturing the chip improves, more circuit modules can be accommodated in a smaller chip area, so that the power consumption per unit area greatly increases. The caused thermal effect will affect the yield efficiency of the chip, thus the thermal effects have become a major issue in the design of semiconductors and systems.

With the enhancement of the complexity of the chip system design, it has become an inevitable trend to shorten the development time of the system hardware and software by using the Electronic System Level (ESL) design. If thermal issues can be taken into consideration during the design stage of Electronic System Level, then it can estimate various solutions for cooling during the design stage of the system architecture to avoid overheating problems after the chip is fabricated and the efficiency of solving the thermal issue is enhanced. Therefore, how to provide a temperature estimation method and device, which are supportable for the system-level, for the designer to efficiently adjust the optimization of the chip design according to the temperature has become a design consideration.

SUMMARY

An embodiment of a thermal estimation device includes a temperature model generator, a temperature gradient calculator, and a thermal sensing analyzer. The temperature model generator generates a temperature model based on an initial power consumption, an initial area and an initial coordination of a circuit module, in which the temperature model is configured for describing a relation of the initial power consumption, the initial area and the initial coordination of the circuit module corresponding to a chip system temperature The temperature gradient calculator substitutes at least one of a testing area, a testing power or a testing coordinate of the circuit module into the temperature model for correspondingly estimating an temperature estimation function. The thermal sensing analyzer differentiates the temperature estimation function.

When an absolute value of a differential result of the temperature estimation function resulted from a constant is closest to zero or is zero, outputting the constant as an optimized parameter.

An embodiment of a thermal estimation method includes: generating a temperature model based on an initial power consumption, an initial area and an initial coordination of a circuit module, in which the temperature model is configured for describing a relation of the initial power consumption, the initial area and the initial coordination of the circuit module corresponding to a chip system temperature; substituting at least one of a testing area, a testing power or a testing coordinate of the circuit module into the temperature model for correspondingly estimating an temperature estimation function; and differentiating the temperature estimation function, wherein when an absolute value of a differential result of the temperature estimation function resulted from a constant is closest to zero or is zero, outputting the constant as an optimized parameter.

DETAILED DESCRIPTION OF DISCLOSED EMBODIMENTS

Figure 1:
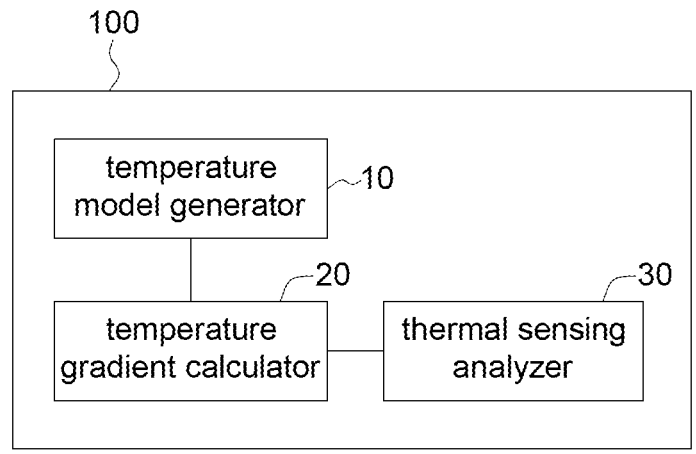
FIG. 1 is a schematic diagram of a thermal estimation device according to an embodiment of the present disclosure.
Figure 2:
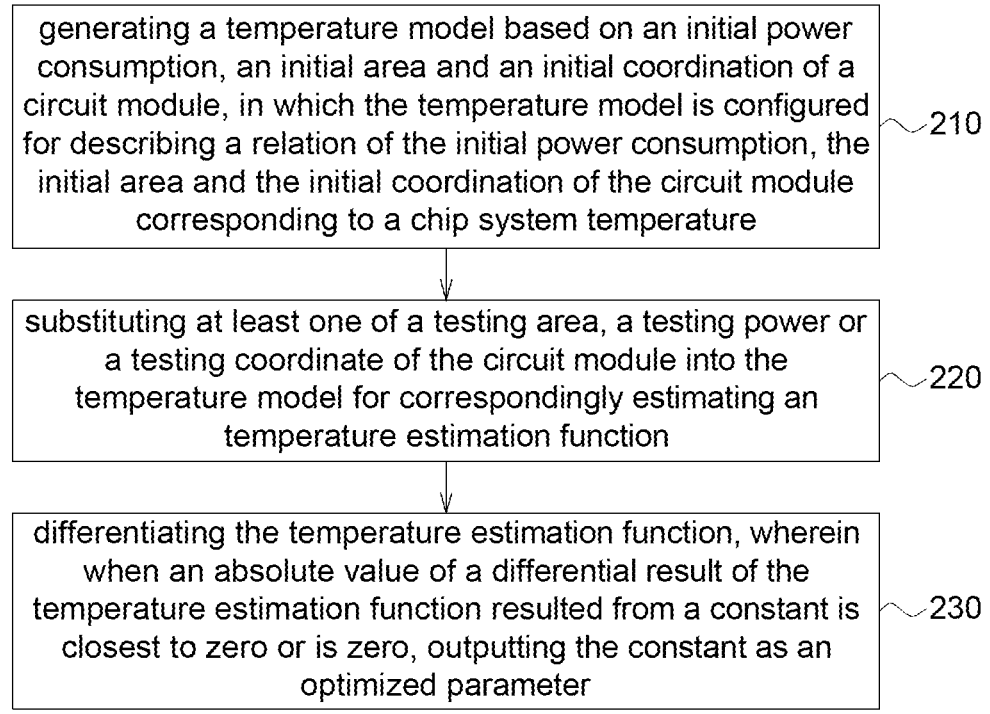
FIG. 2 is a flowchart of a thermal estimation method according to an embodiment of the present disclosure.

Reference is made to FIG. 1 and FIG. 2. FIG. 1 is a schematic diagram of a thermal estimation device 100 according to an embodiment of the present disclosure. FIG. 2 is a flowchart of a thermal estimation method according to an embodiment of the present disclosure. In an embodiment, the thermal estimation device 100 is adapted for assisting to adjust the design of a chip, so that the behavior of the chip system temperature complies with the demand of the designer. The thermal estimation device 100 includes a temperature model generator 10, a temperature gradient calculator 20, and a thermal sensing analyzer 30. In an embodiment, the temperature model generator 10 is electrically coupled to the temperature gradient calculator 20, and the temperature gradient calculator 20 is electrically coupled to the thermal sensing analyzer 30. In an embodiment, the thermal estimation device 100 may be a tablet computer, a laptop computer, a server, or other device with the function, and the temperature model generator 10, the temperature gradient calculator 20, and the thermal sensing analyzer 30 may be separately or jointly implemented by a microcontroller, a microprocessor, a digital signal processor, an application specific integrated circuit (ASIC), or a logic circuit.

In an embodiment, the thermal estimation method in FIG. 2 may be implemented by performing the program in a non-transitory computer readable storage medium, and the temperature model generator 10, the temperature gradient calculator 20, and the thermal sensing analyzer 30 may be a portion of codes in the program. The storage medium may a memory, a hardware, a memory card or an access device in remote connection.

In operation 210, the temperature model generator 10 is configured for generating a temperature model according to an initial power consumption, an initial area and an initial coordination of a circuit module BK1, in which the temperature model is configured for describing a relation of the initial power consumption, the initial area and the initial coordination of the circuit module BK1 corresponding to a chip system temperature.

In an embodiment, the temperature model generator 10 will firstly generate the formula of the chip system temperature corresponding to the area, power consumption, and the coordinate of the circuit module BK1: $T_{em}=f(P, A, L_x, L_y)$, in which the character '$T_{em}$' represents the chip system temperature, the character 'P' represents the power consumption, the character 'f' represents the temperature function, the character 'A' represents the area, the character '$L_x$' represents the X coordinate of the circuit module BK1, and the character '$L_y$' represents the Y coordinate of the circuit module BK1. At this time, the area, the power consumption, and the coordinate may exist in form of variable(s).

In operation 220, the temperature gradient calculator 20 is configured for substituting at least one of a testing area, a testing power consumption or a testing coordinate of the circuit module BK1 in a form of variable into the temperature model for correspondingly estimating a temperature estimation function. For example, to seek for the optimized power consumption, the power consumption P retains and the values of the area and the coordinate are substituted into the formula so that $T_{em}=f(P)$ is obtained.

Next, the temperature gradient calculator 20 generates the gradient function according to the user's desired specification for the temperature. The concept of the establishment of the temperature estimation function is to obtain the quadratic form of the difference of the chip system temperature (Tem) and the target temperature. Its purpose is to establish the measurement of the absolute value (the quadratic form) of the difference of the chip system temperature and the target temperature. If it is able to find a value for the variable of the temperature estimation function that enables the quadratic form of the difference of the temperature to be smaller, it means that the gap between each temperature and the target temperature is smaller, i.e., more close to the target temperature, then the value is the optimized design parameter for the variable.

Figure 3:
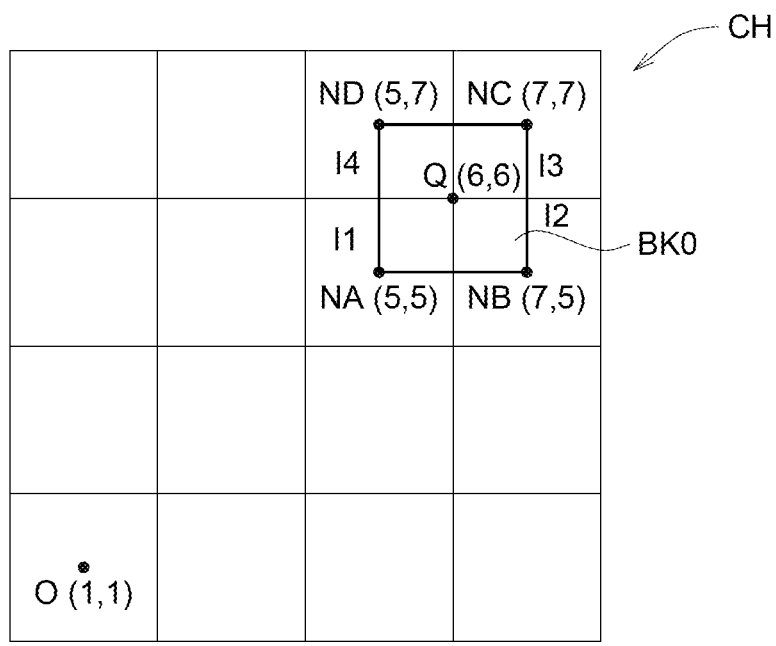
FIG. 3 is a schematic diagram of a chip layout according to an embodiment of the present disclosure.

Reference is made to FIG. 3. FIG. 3 is a schematic diagram of a chip layout according to an embodiment of the present disclosure. The chip CH is cut in the unit of the grid, i.e., the length and the width of the chip are cut based on the fixed size. In an embodiment, in order to describe conveniently, each square cut originally from the chip CH is named 'grid', e.g., the grids I1-I4. Moreover, the chip CH further includes at least one circuit module, e.g. the circuit module BK0.

In an embodiment, the temperature model generator 10 determines at least one grid occupied by the circuit module BK0 (e.g., the grids I1-I4) among the grids of the chip CH (i.e., each square cut originally from the chip CH) according to the initial coordinate of the circuit module BK0.

As shown in FIG. 3, the coordinate of the center of the square circuit module BK0 is (6, 6), and its four vertices NA-ND are located at the coordinates (5, 5), (7, 5), (7, 7), (5, 7), respectively. In order to describe conveniently, in the present embodiment, these four vertices NA-ND are located at the center of the grids I1-I4, respectively. However, FIG. 3 is an exemplary embodiment, and the location of each vertex of the circuit module BK0 is not limited thereto.

Since the power consumption is generated while the circuit module BK0 works, the power consumption has influence on the temperature variance in all grids of the chip CH. Therefore, the temperature model generator 10 is able to calculate the temperature estimation function generated by the circuit module BK0 on an observation point O. The calculation of the temperature estimation function is described in detail as below.

In an embodiment, the temperature model generator 10 is able to calculate that a quarter of the initial area of each grid I1-I4 is occupied by the circuit module BK0 (In practical, the temperature model utilizes the bell curve while calculating the area. The present embodiment is an example for easy illustration, and the embodiment of the bell curve will be described afterwards). Next, the total power consumption of the circuit module BK0 is multiplied by the proportion of the overlapping area between each grid and the circuit module BK0 to the initial area of the circuit module BK0, so as to obtain the initial power consumption of the circuit module BK0 distributed on each grid I1-I4 is P/4. In other words, the initial power consumption that the circuit module BK0 consumes on each grid I1-I14 all is P/4.

In an embodiment, the temperature model generator 10 calculates the distance between the observation point O and the center of each grid I1-I4 occupied by the circuit module BK0, and calculates the rate of temperature rise of each grid I1-I4 to the observation point O according to the distance. For example, the coordinates (5, 5), (7, 5), (7, 7), and (5, 7) of the centers NA-ND of the grids I1-I4 of the circuit module BK0 are substituted into a rate of temperature rise model, respectively, the rate of temperature rise model is:

$$T_x=-a*\ln(\overline{OX})+b,$$

in which $T_x$ is the rate of temperature rise of which the grid contributes to the observation point (e.g., the observation point O). In an embodiment, the distance OX represents the distance between the center X of the grid and the observation point O, for example, it is able to substitute the coordinates of the centers NA-ND of the grids I1-I4 into X for calculation. For example, the distance OA represents the center A of the grid and the observation point O. Moreover, the parameters 'a' and 'b' are a constant. In an embodiment, the parameter 'a' is set as 100, and the parameter 'b' is set as 300. Accordingly, the rates of temperature rise $T_A$, $T_B$, $T_C$, $T_D$, of which four vertices of the circuit module BK0 contribute to the observation point O, are able to be calculated as below:

$$T_A=-100\times\ln[\sqrt{(5-1)^2+(5-1)^2}]+300=126.8$$

$$T_B=-100\times\ln[\sqrt{(7-1)^2+(5-1)^2}]+300=102.4$$

$$T_C=-100\times\ln[\sqrt{(7-1)^2+(7-1)^2}]+300=86.2$$

$$T_D=-100\times\ln[\sqrt{(5-1)^2+(7-1)^2}]+300=102.4$$

Next, the temperature model generator 10 multiplies the rate of temperature rise $T_A$, $T_B$, $T_C$, $T_D$ of each grid I1-I4 to the observation point O by the initial power consumption occupied by each gird I1-I4 itself (represented by $P_A$, $P_B$, $P_C$, $P_D$, respectively, and all is P/4), so as to obtain a grid temperature estimation function of each grid I1-I4 itself. Then, the temperature model generator 10 adds up the grid temperature estimation function of each grid I1-I4, so as to calculate a temperature estimation function generated by the circuit module BK0 to the observation point O. In the present embodiment, the temperature estimation function is represented as below:

$$T_A P_A + T_B P_B + T_C P_C + T_D P_D = PW/4(126.8 + 102.4 + 86.2 + 102.4) = 104.45 \times PW$$

Therefore, the temperature estimation function generated by the circuit module BK0 to the observation point O is calculated on the condition that the power consumption is P while the circuit module BK0 works.

However, the present disclosure is not limited thereto. In some embodiments, the range of the circuit module BK0 still covers at least a portion of each grid I1-I4. Even four vertices NA-ND of the circuit module BK0 are not located at the centers of the grids I1-I4, it still be able to utilize the aforementioned coordinates of the centers of the grids I1-I4 to calculate.

Figure 4:
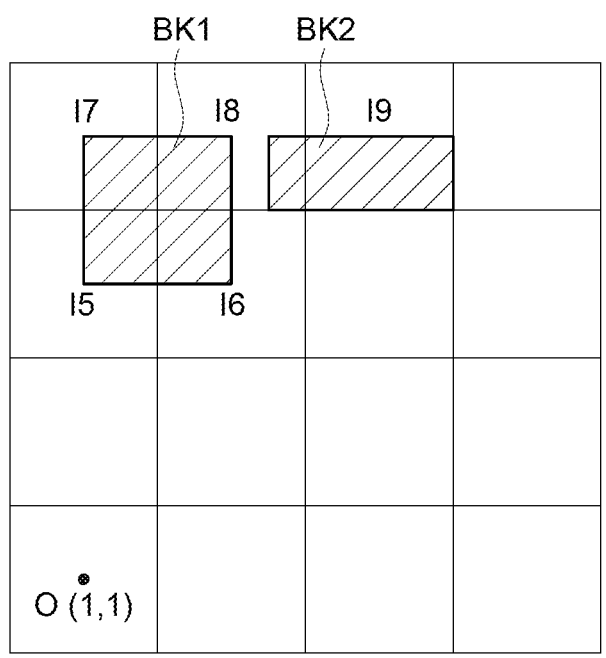
FIG. 4 is a schematic diagram of a chip layout according to an embodiment of present disclosure.
Figure 5:
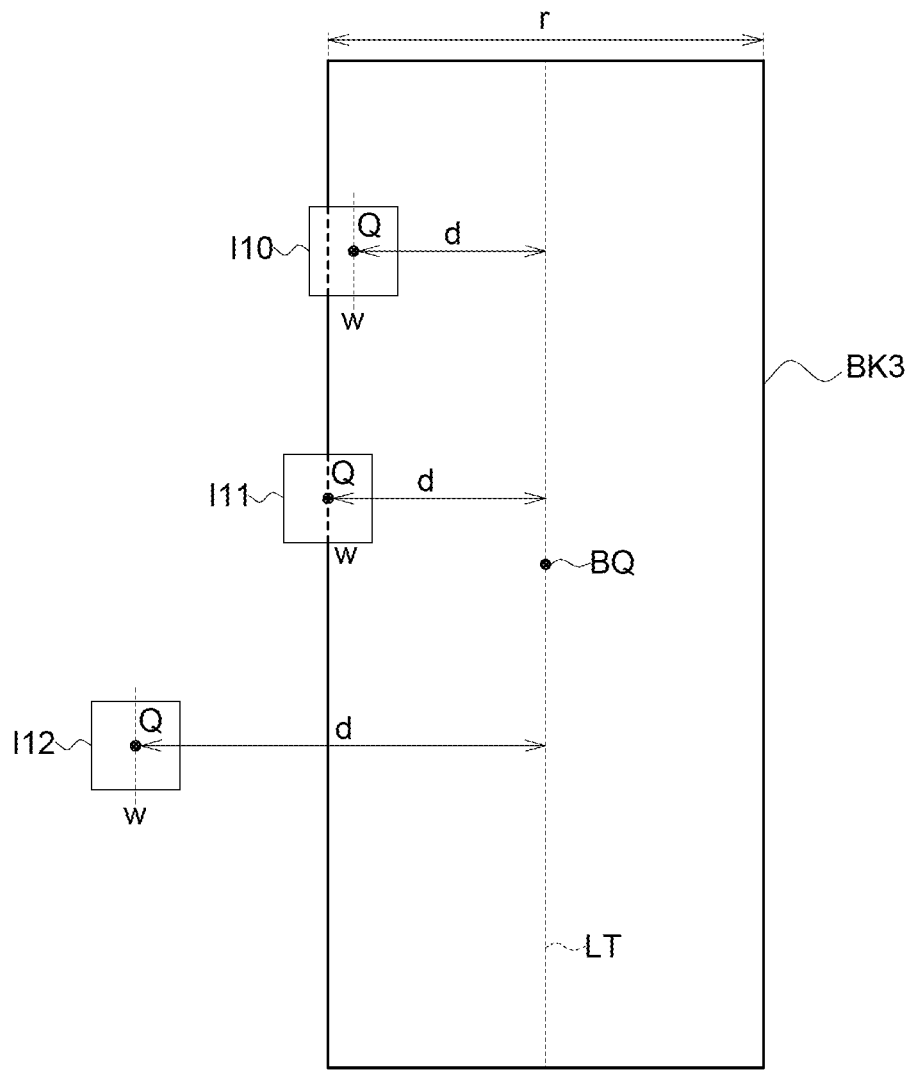
FIG. 5 is a schematic diagram of a portion of a chip layout according to an embodiment of the present disclosure.
Figure 6A:
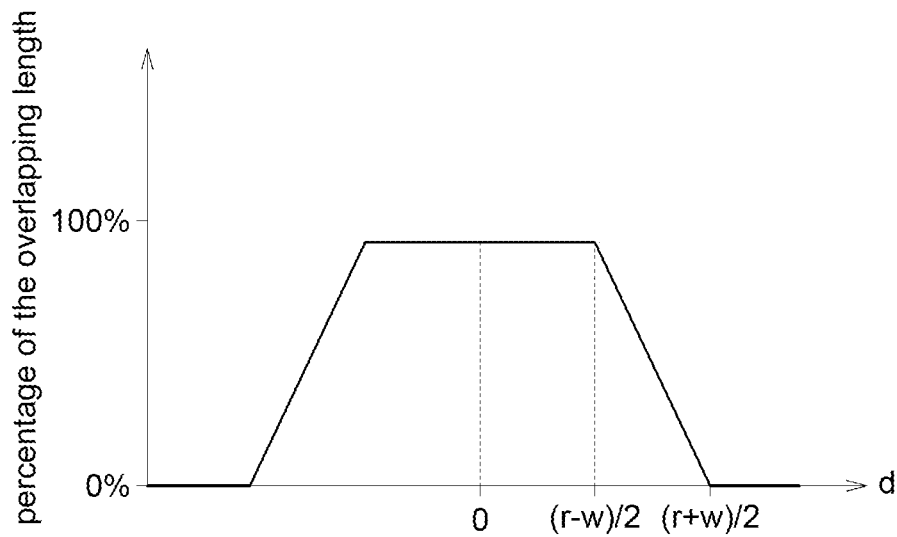
FIGS. 6A-6B are schematic diagrams of a method for calculating an overlapping area according to an embodiment of present disclosure.
Figure 6B:
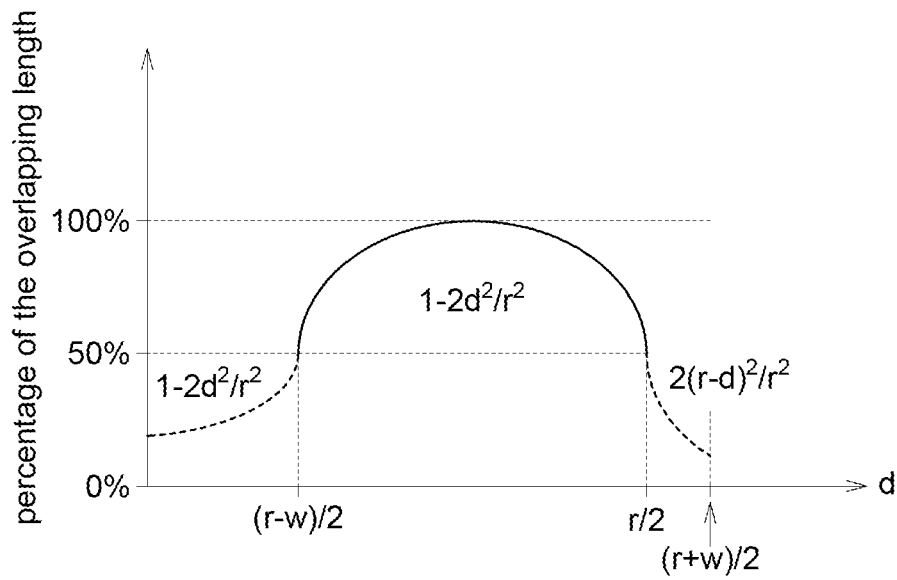

Next, the reference is made to FIG. 4, FIG. 5, and FIG. 6A-6B. FIG. 4 is a schematic diagram of a chip layout according to an embodiment of present disclosure. FIG. 5 is a schematic diagram of a portion of a chip layout according to an embodiment of the present disclosure. FIGS. 6A-6B are schematic diagrams of a method for calculating an overlapping area according to an embodiment of present disclosure. In the embodiment in FIG. 3, for the convenience of comprehension, the coordinates of four vertices of the circuit module BK0 are exemplarily located at the coordinates of the centers of the grids I1-I4, and the overlapping area between four grids I1-I4 and the circuit module BK0 are a quarter of the total area of the circuit module BK0, respectively. The following embodiments in FIG. 4, FIG. 5, and FIG. 6A-6B are configured for completely calculating the overlapping areas between the grids I7-I12 and the circuit modules BK1-BK3.

In some embodiments, as shown in FIG. 4, the grids I5-I9 include several circuit modules BK1-BK2. In some embodiments, these circuit module BK1-BK2 may overlay or arrange side-by-side on the grids I5-I9, in which the term 'overlay' in the present disclosure represents that a single grid includes several circuit modules, as shown in the example in FIG. 4, the grid I8 includes a portion of the circuit module BK1 and a portion of the circuit module BK2.

In an embodiment, as shown in FIG. 4, the power consumption distribution described in the unit of the circuit module BK1, BK2 is converted into the power consumption distribution described in the unit of the grids I5-I9. The calculation is to multiply the overlapping area between each grid and the circuit module (e.g., the circuit module BK1) by the power consumption of the circuit module BK1, so as to obtain the distribution of the power consumption of the circuit module BK1 on the grid I8. Take FIG. 4 as an example, it is supposed that the power consumption of the circuit module BK1 is $P_1$ and the power consumption of the circuit module BK2 is $P_2$. The circuit module BK1 overlaps with the grids I5-I8, and the overlapping area between each grid I5-I5 and the circuit module BK1 are a quarter of the total area of the circuit module BK1, respectively. Therefore, the circuit module BK1 contributes the power consumption of $P_1/4$ to each grid I5-I8. The circuit module BK2 overlaps with the girds I8, I9, the overlapping areas between the grids I8, I9 and the circuit module BK2 are one fifth and four fifth of the total area of the circuit module BK2, respectively. Therefore, the circuit module BK2 contributes the power consumption of $P_2/5$ and $P_2*4/5$ to the grids I8, I9, respectively. Accordingly, when describing the distribution of the power consumption of the circuit, the power consumptions of the grids except the grids I5-I9 are 0, the power consumptions of the grids I5-I7 are $P_1/4$, the power consumption of the grid I8 is $P_1/4 + P_2/5$, and the power consumption of the grid I9 is $P_2*4/5$.

In the aspect of calculating the overlapping area, the calculation is that the overlapping length between the circuit module BK1 and each grid in the x direction is multiplied by the overlapping length between the circuit module BK1 and each grid in the y direction. In order to functionalized the calculation, the percentage of the horizontal distance or the vertical distance between the circuit module BK1 and the center of each grid and the overlapping length in the horizontal direction or in the vertical direction is shown in FIG. 6A. In an embodiment, reference is made to FIG. 5 and FIG. 6B. FIG. 5 illustrates three examples of the overlap or the side-by-side arrangement between the circuit module BK3 and the grids I10-I12. The character 'd' in the horizontal axis represents the horizontal distance or vertical distance between the coordinate of the center of the circuit module BK3 and the coordinate of the center of the grid. The width of the circuit module BK3 is represented by 'r', and the width of the grids I10-I12 is represented by 'w'. When the distanced is less than (w−r)/2, it represents that the grid in the horizontal direction or in the vertical direction completely overlaps with the circuit module BK3 and the percentage of the overlapping length in the horizontal direction or in the vertical direction is 100%. When the distance d is greater than (r+w)/2, it represents that the grid in the horizontal direction or in the vertical direction does not overlap with the circuit module BK3 and the percentage of the overlapping length is 0%. When the distance d is between (r+w)/2 and (w−r)/2, the percentage of the overlapping length decreases from 100% to 0% along with the increase of the distance d.

As shown in FIG. 5, there are three examples of the arrangement of the girds I10-I12 on the circuit module BK3, in which the width of the circuit module BK3 is represented by the character 'r', the width of the grid is represented by the character 'w' (In the following embodiment, the width w of the grid is assumed as 2), and the X axis of the center BQ of the circuit module BK3 is represented by the central axis LT. These examples may be implemented separately, and the present disclosure is not limited thereto. Moreover, FIG. 5 takes the X-axis as a central axis LT as an example. In practical applications, the Y-axis may also be used as the central axis jointly or separately.

In an embodiment, the grid I10 partially overlaps with the circuit module BK3, and the center of the grid I10 is represented by the character Q. It is supposed that the center Q of the grid I10 is within the range of the width r of the circuit module BK3 and the distance from the central axis LT to it is d. In the present example, the distance d is less than a half of the difference between the width r and the width w of the grid (r/2−w/2). The calculation for the percentage of the overlap is viewed as $(1-2d^2/r^2$. Therefore, when the width r is 10 and the distance d is 3, the percentage of the overlap is $1-2d^2/r^2=82\%$.

In another embodiment, the grid I11 partially overlaps with the circuit module BK3, and the center of the grid I11 is represented by the character Q. It is supposed that the center Q of the grid I10 is out of the range of the width r of the circuit module BK3 and the distance from the central axis LT to it is d. In the present example, the distance d is between a half of the difference between the width r and the width w of the grid (r/2−w/2) and a half of the sum of the width r and the width w of the grid (r/2+w/2). The calculation for the percentage of the overlap is viewed as $2(r-d)^2/r^2$. Therefore, when the width r is 10 and the distance d is 5, the percentage of the overlap is $2(r-d)^2/r^2=50\%$.

In yet another example, the grid I12 does not overlap with the circuit module BK3, and the center of the grid I12 is represented by the character Q. It is supposed that the center Q of the grid I12 is out of the range of the width r of the circuit module BK3 and the distance from the central axis LT to it is d. In the present example, the distance d is greater than a half of the sum of the width r and the width w of the grid (r/2+w/2). The calculation for the percentage of the overlap is viewed as $2(r-d)^2/r^2$, the percentage of the overlap is set as 0. Therefore, the percentage of the overlap is 0%.

Since the embodiment of the present disclosure is to use a differentiable relation formula for associating the coordinate of the circuit module with the temperature, the parameter of the chip design is able to be adjusted. In an embodiment, the functional relationship shown in FIG. 6A may be related to the distance between the circuit modules BK0-BK3 and the center of each grid and the percentage of the overlapping length in FIGS. 3-5. However, in FIG. 6A, when the distance d is (r+w)/2 and the distance d is (w-r)/2, the function is less likely to be differentiated. Therefore, an embodiment of the present disclosure is able to further use the bell curve function shown in FIG. 6B instead of the function in FIG. 6A to calculate the overlapping area.

In an embodiment, the temperature model generator 10 calculates the overlapping area between each circuit module (e.g., the circuit module BK3) and each grid (e.g., the grids I10-I12) by using the bell-shaped function, in which the bell-shaped function is configured for describing the overlapping rate of the horizontal distance or the vertical distance. The overlapping area between each grid I10-I12 and the circuit module BK3 is able to be obtained by multiplying the grid area of each grid I10-I12 by the horizontal overlapping rate and the vertical overlapping rate, and the bell-shaped function is differentiable. The horizontal overlapping rate multiplied by the vertical overlapping rate is equal to the area overlapping rate.

In FIG. 6, it illustrates schematic diagram of a function of the calculation for the ratio of the overlapping area; however, the curve in FIG. 6A is discontinuous at the distance d of (r+w)/2 and (w-r)/2 thus it is less likely to be differentiated. In order to make the calculation for the overlapping area continuous and differentiable, as shown in the embodiment in FIG. 6B, it illustrates a schematic diagram of the bell-shaped function curve appeared by three cases shown in FIG. 5, so that it is differentiable. The following description defines the bell-shaped function applied in the method for calculating the overlapping area on several conditions.

The method for calculating the percentage of the overlap is able to be obtained from the aforementioned embodiment in FIG. 5.

Reference is made to FIG. 4 again. In an embodiment, when the grid I8 includes a portion of the circuit module BK1 and a portion of the circuit module BK2, the total power consumption on the grid I8 is able to be calculated by adding up the power consumption of the circuit module BK1 multiplied by the area of the grid I8 overlapped with the circuit module BK1 and the power consumption of the circuit module BK2 multiplied by the area of the grid I8 overlapped with the circuit module BK2. The total power consumption of the remaining grid is also calculated in this way, and thus no further description will be given herein.

By the aforementioned method, since the power consumption of each grid has been obtained, the temperature estimation function can be obtained by adding up the influence of the power consumption of each grid on the temperature of all the grids of the chip.

For example, the total power consumption on the grid I8 is multiplied by the rate of temperature rise corresponding to the grid I8 to the observation point O to obtain the temperature estimation function caused by the total power consumption of the grid I8 to the observation point O.

It can be seen from the aforementioned description that, in an embodiment of the present disclosure, the temperature model is able to be established by first converting the power consumption, the area and the coordinate position described in the unit of the circuit module into the power consumption, the area and the coordinate position described in the unit of the grid. Finally, taking each grid as the unit, the final temperature model is established according to the distance between the grid of the observation point and the grid of the heat source and a relation formula about the heat source in the grid of the heat source having influence on the grid of the observation point. Accordingly, the temperature model generator 10 generates a temperature model able to estimate the influence of the area, the power consumption, and the coordinate of each circuit module on the chip system temperature, in which the temperature model is an operation formula with differentiability. After the temperature model is established, operation 220 is performed.

In an embodiment, the circuit module described in operation 220 may refer to a circuit module (such as BK0 shown in FIG. 3, BK1-2 shown in FIG. 4, and BK3 shown in FIG. 5) or other circuit module to be tested. In other words, in operation 220, the temperature gradient calculator 20 is able to substitute the known information of the circuit module to be tested or the information preset by the user into the temperature model to obtain the unknown information or the information that the user seeks for, for example, substituting the test power consumption and test coordinate into the temperature model to estimate correspondingly the temperature estimation function.

In operation 230, the thermal sensing analyzer 30 is configured for differentiating the temperature estimation function. When the absolute value of the differential result of the temperature estimation function resulted from a constant is closest to zero or zero, outputting the constant as an optimized parameter. In an embodiment, the thermal sensing analyzer 30 outputs the optimized parameter so that at least one of the power consumption, the area, or the layout of the circuit module in a chip is able to be adjusted according to the optimization parameter.

Figure 7:
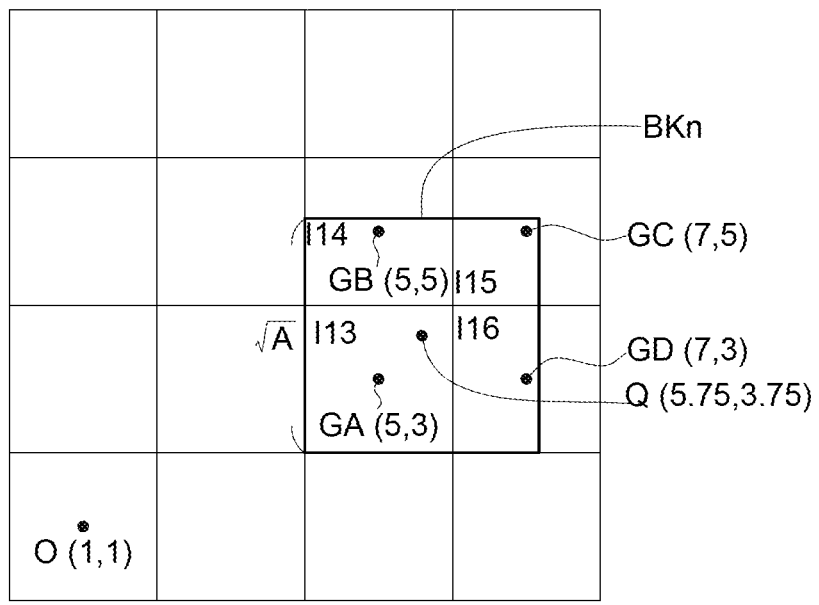
FIG. 7 is a schematic diagram of a chip layout according to an embodiment of present disclosure.

Reference is made to FIG. 7. FIG. 7 is a schematic diagram of a chip layout according to an embodiment of present disclosure. In the embodiment shown in FIG. 7, the circuit module BKn is a circuit module to be tested, which represents the operation is for the data of the circuit module BKn at present, to find out the optimal position (layout) of the circuit module BKn. The temperature gradient calculator 20 is able to receive part of the data about circuit module BKn to estimate a temperature estimation function.

In the embodiment shown in FIG. 7, the circuit module BKn is a square circuit module to be tested. It is supposed that the area of the circuit module BKn is represented by the character A (assuming the initial value is 12.25), the side length is represented by the character $\sqrt{A}$ (assuming the initial value is 3.5), the power consumption is represented by the character P, the power density is P/A, the grid width w is 2, and the coordinate Q (Sx, Sy) of the center is (5.75, 3.75). In the following embodiments, the overlapping distance (length) between the coordinate Q of the center of the circuit module BKn and the coordinates of the centers GA-GD of each grid I13-I15 is represented by the distance d.

In the present example, for the grid I13, the overlapping distance (length) d in the x direction is 5.75−5=0.75, the grid width w is 2, the side length $\sqrt{A}$ is 4. Since the distance d complies with the following formula: d<(r−w)/2, according to the bell-shaped function curve shown in FIG. 6B, the overlapping distance (length) d in the x direction between the circuit module BKn and the grid I13 is w*2 (1−2d²/r²), in which the x coordinate of the circuit module BKn is $S_x$, the x coordinate of the grid I13 is 5, the overlapping distance (length) d is $S_x$−5, the overlapping distance d in the x direction is w*2(1−2d²/r²)=w*[1−2($S_x$−5)²/r]. Similarly, the overlapping distance (length) d of the grid I13 in the y direction is 3.75−3=0.75, the grid width w is 2 and the side length $\sqrt{A}$ is 4. Since the overlapping distance (length) d complies with the following formula: d<(r−w)/2, according to the bell-shaped function curve shown in FIG. 6B, the overlapping distance (length) d in the y direction between the circuit module BKn and the grid I13 is w*2[1−2d²/r²]=w*2[(1−2($S_y$−3)²/r]. Therefore, the distribution of the power consumption of the circuit module BKn on the grid I13 is:

$$P/A * w*[1-2(S_x-5)^2/r)]*w*2[1-2(S_y-3)^2/r]$$

The temperature estimation function $T_{GA}$ caused by the grid I13 to the grid O (1, 1) is:

$$P/A * w*[1-2(Sx-5)^2/r)]*w*2[1-2(Sy-3)^2/r]*[-100*\ln\sqrt{(5-1)^2+(3-1)^2}\times+300]$$

In the present example, for the grid I14, the overlapping distance (length) d in the x direction is 5.75−5=0.75, the grid width w is 2, the side length $\sqrt{A}$ is 4. Since the overlapping distance (length) d complies with the following formula: d<(r−w)/2, according to the bell-shaped function curve shown in FIG. 6B, the overlapping distance (length) d in the x direction between the circuit module BKn and the grid I13 is w*2(1−2d²/r²)=w*[1−2*(5−$S_x$)²/r²]. Similarly, the overlapping distance (length) d of the grid I14 in the y direction is 5−3.75=1.25, the grid width w is 2 and the side length $\sqrt{A}$ is 4. Since the overlapping distance (length) d complies with the following formula: (r−w)/2<d<(r+w)/2, according to the bell-shaped function curve shown in FIG. 6B, the overlapping distance (length) d in the y direction between the circuit module BKn and the grid I14 is w*2(r−d)²/r²=w*2[(r−(5−$S_y$)]²/r². Therefore, the distribution of the power consumption of the circuit module BKn on the grid I14 is:

$$P/A*w*2[1-2(5-S_x)^2/r^2)]*w*2[r-(5-S_y)]^2/r^2$$

The temperature estimation function $T_{GB}$ caused by the grid I14 to the grid O (1, 1) is:

$$P/A*w*2[1-2(5-S_x)^2/r^2)]*w*2[r-(5-S_y)]^2/r^2*[-100*\ln\sqrt{(5-1)^2+(5-1)^2}+300]$$

In the present example, for the grid I15, the overlapping distance (length) d in the x direction is 7−5.75=1.25, the grid width w is 2, the side length $\sqrt{A}$ is 4. Since the overlapping distance (length) d complies with the following formula: (r−w)/2<d<(r+w)/2, according to the bell-shaped function curve shown in FIG. 6B, the overlapping distance (length) d in the x direction between the circuit module BKn and the grid I15 is w*2(r−d)²/r²=w*2[(r−(7−$S_x$)]²/r². Similarly, the overlapping distance (length) d of the grid I13 in the y direction is 7−5.75=1.25, the grid width w is 2 and the side length $\sqrt{A}$ is 4. Since the overlapping distance (length) d complies with the following formula: (r−w)/2<d<(r+w)/2, according to the bell-shaped function curve shown in FIG. 6B, the overlapping distance (length) d in the y direction between the circuit module BKn and the grid I15 is w*2(r−d)²/r²=w*2[(r−2(7−$S_y$)]²/r². Therefore, the distribution of the power consumption of the circuit module BKn on the grid I15 is:

$$P/A*w*2[(r-(7-S_x)]^2/r^2*w*2[(r-2(7-S_y)]^2/r^2$$

The temperature estimation function $T_{GC}$ caused by the grid I15 to the grid O (1, 1) is:

$$P/A*w*2[(r-(7-S_x)]^2/r^2*w*2[(r-2(7-S_y)]^2/r^2*[-100*\ln\sqrt{(7-1)^2+(5-1)^2}+30]$$

In the present example, for the grid I16, the overlapping distance (length) d in the x direction is 7−5.75=1.25, the grid width w is 2, the side length $\sqrt{A}$ is 4. Since the overlapping distance (length) d complies with the following formula: (r−w)/2<d<(r+w)/2, according to the bell-shaped function curve shown in FIG. 6B, the overlapping distance (length) d in the x direction between the circuit module BKn and the grid I16 is w*2(r−d)²/r²=w*2[(r−(7−$S_x$)]²/r². Similarly, the overlapping distance (length) d of the grid I15 in the y direction is 3.75−3=0.75, the grid width w is 2 and the side length $\sqrt{A}$ is 4. Since the overlapping distance (length) d complies with the following formula: d<(r−w)/2, according to the bell-shaped function curve shown in FIG. 6B, the overlapping distance (length) d in the y direction between the circuit module BKn and the grid I16 is w*(1−2d²/r²)=w*[(1−2($S_y$−3)²/r²]. Therefore, the distribution of the power consumption of the circuit module BKn on the grid I16 is:

$$P/A*w*2[(r-(7-S_x)]^2/r^2*w*[(1-2(S_y-3)^2/r^2]$$

The temperature estimation function $T_{GD}$ caused by the grid I16 to the grid O (1, 1) is:

$$P/A*w*2[(r-(7-S_x)]^2/r^2*w*[(1-2(S_y-3)^2/r^2]*[-100*\ln\sqrt{(7-1)^2+(3-1)^2}+300]$$

According to the aforementioned calculation method, the temperature gradient calculator 20 calculates the temperature estimation functions $T_{GA}$, $T_{GB}$, $T_{GC}$ and $T_{GD}$, and the temperature estimation function $T_{total}$ caused by the circuit module BKn to the grid point O is the sum of the temperature estimation functions $T_{GA}$, $T_{GB}$, $T_{GC}$ and $T_{GD}$. In the mathematical expression, the temperature estimation function $T_{total}$ is represented by: $T_{total}(P, A, S_x, S_y) = T_{GA}, T_{GB}, T_{GC}, T_{GD}$.

In an embodiment, it is supposed on the condition that the power consumption of the circuit module BKn and the coordinate are unvaried, the optimal area size of the circuit module BKn is desired to obtained so that the rate of temperature rise caused by the circuit module BKn to the grid O is minimized, it represents that the optimal value of the area A to be obtained enables the value of the temperature estimation function $T_{total}$ (A) to be minimized. The variable only includes the area A, the power consumption P, the x coordinate $S_x$ and the y coordinate $S_y$ are unvaried. It is assumed that the power consumption P is 100, the x coordinate $S_x$ is 5.75, the y coordinate $S_y$ is 3.75. After the information is substituted into the temperature estimation function $T_{total}$, it is able to obtain the side length r is $\sqrt{A}$, the grid width w is 2, and the temperature estimation function $T_{total}$ finally becomes the function containing only the area A. The mathematical formula is:

$$T_{total}=m0+m1*A^{-2}+m2*A^{-1.5}+m3*A^{-1}+m4*A^{-0.5}m5*A^{0.5}+m6*A+m7*A^{1.5}+m8*A^2,$$

in which the characters m0-m8 are coefficients of each variable, for example, the coefficient of the power consumption P is 404.45 PW. The power of the area A totally includes eight cases, and it is presented in the mathematical formula by:

$$A^{-2}, A^{-1.5}, A^{-1}, A^{-0.5}, A^{-0.5}, A^{1}, A^{1.5}, A^{2}$$

Next, the thermal sensing analyzer 30 differentiates the temperature estimation function $T_{total}$ by the area A to obtain:

$$\frac{\partial T_{total}}{\partial A} = -2*m_1*A^{-3} - 1.5*m_2*A^{-2.5} - 2*m_3*A^{-2} - 0.5*m_4*A^{-1.5} + 0.5*m_5*A^{-0.5} + m_6 + 1.5*m_7*A^{0.5} + 2*m_8*A$$

To seek for the value A of the area for this differential formula to make the differential value is 0 or is the minimum absolute value, then this value A of the area is the optimal value.

On the aforementioned condition of the single variable including the area A, it is able to realize how to design the area of the circuit module BKn so that the circuit module BKn has the smallest influence on the chip temperature. Moreover, the aforementioned method is able to be applied in the power consumption P, the x coordinate $S_x$, and the y coordinate $S_y$, too. As long as retaining the variable desired to be optimized in the temperature estimation function $T_{total}$ and substituting the other variables in the form of values into the temperature estimation function $T_{total}$, so that the variable retained in the temperature estimation function $T_{total}$ is only the variable desired to be optimized. Next, differentiating the temperature estimation function $T_{total}$ by this variable to obtain the value of the variable that enables the differential value to be 0 or the minimum absolute value, and this value is optimal for this variable.

In an embodiment, it is also able to calculate a plurality of variables to find the optimal values of the plurality of variables, thereby adjusting the chip design. For example, by setting the coordinate position and the area of the circuit module can find the optimal value for power consumption.

In an embodiment, the temperature model generator 10 utilizes a heat mirroring method for compensating for a boundary temperature of the chip.

Figure 8:
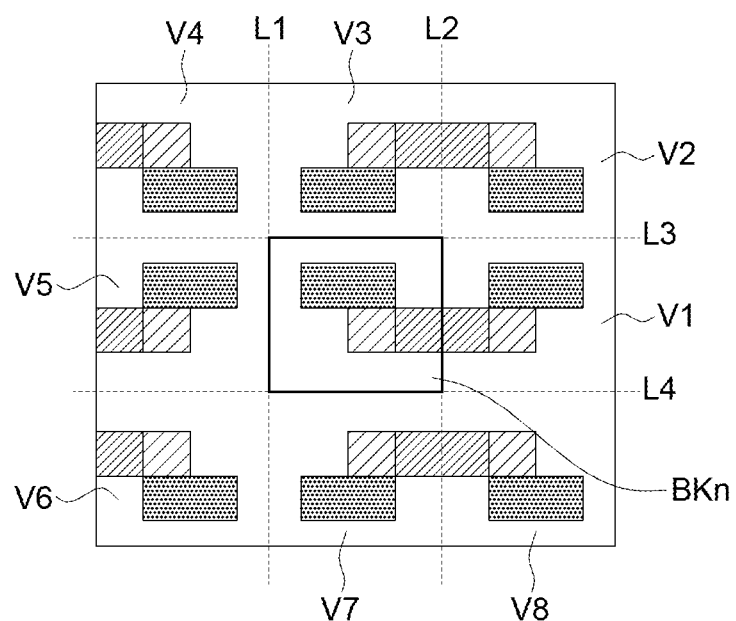
FIG. 8 is a schematic diagram of a heat source mirroring method for compensating for the boundary temperature of a chip according to an embodiment of present disclosure.

Reference is made to FIG. 8. FIG. 8 is a schematic diagram of a heat source mirroring method for compensating for the boundary temperature of a chip according to an embodiment of present disclosure. Since the area of the side of the chip is much smaller than that of the top and the bottom of the chip, the main heat dissipation path is conducted from top to bottom and the heat rarely flow from side to side. It is not easy to accurately describe the temperature near the horizontal boundary by the rate of temperature rise. Therefore, the mirroring method for compensating for the boundary temperature of the chip is further applied in an embodiment of the present disclosure. For example, in FIG. 8, the temperature model generator 10 adds eight virtual heat sources V1-V8 according to the periphery of the circuit module BKn. In an embodiment, the virtual heat source V1 is generated by mirroring the heat source of the circuit module BKn along the axis L2. The virtual heat source V2 is generated by mirroring the heat source of the virtual heat source V1 along the axis L3. The virtual heat source V3 is generated by mirroring the heat source of the circuit module BKn along the axis L3. The virtual heat source V4 is generated by mirroring the heat source of the virtual heat source V3 along the axis L1. The virtual heat source V5 is generated by mirroring the heat source of the circuit module BKn along the axis L1. The virtual heat source V6 is generated by mirroring the heat source of the virtual heat source V5 along the axis L4. The virtual heat source V7 is generated by mirroring the heat source of the circuit module BKn along the axis L4. The virtual heat source V8 is generated by mirroring the heat source of the virtual heat source V7 along the axis L4. However, the method for generating the virtual heat sources V1-V8 is not limited thereto. Accordingly, when the temperature model generator 10 performs the temperature-related calculation, the temperature of the adiabatic boundary can be compensated by adding a new mirror heat source at equal distances outside the boundary of the circuit module BKn.

The embodiments of the present disclosure may be able to support the system-level chip layout. The embodiments of the present disclosure may further take the effect of the temperature into the consideration while designing the chip layout, and the virtual result is generated by substituting the preset or known parameter into the temperature model so as to obtain the optimized parameter. The chip design is adjusted according to the optimized parameter to prevent the chip from overheating. Moreover, the heat source mirroring method is applied in the present disclosure for compensating for the boundary temperature of the chip, so as to enhance the precision of the estimation of the temperature. The embodiments of the present disclosure are adapted for assisting to adjust the power consumption, the area, and/or the layout of circuit module in a chip, so that the behavior of the chip system temperature complies with the demand of the designer.

Although the present disclosure has been described in considerable detail with reference to certain embodiments thereof, other embodiments are possible. Therefore, the scope of the appended claims should not be limited to the description of the embodiments contained herein.

What is claimed is:

1. A thermal estimation device, comprising:
   a temperature model generator configured for generating a temperature model according to an initial power consumption, an initial area and an initial coordination of a circuit module, wherein the temperature model is configured for describing a relation of the initial power consumption, the initial area and the initial coordination of the circuit module corresponding to a chip system temperature;
   a temperature gradient calculator configured for substituting at least one of a testing area, a testing power consumption or a testing coordinate of the circuit module into the temperature model for correspondingly estimating a temperature estimation function; and
   a thermal sensing analyzer configured for differentiating the temperature estimation function, wherein when an absolute value of a differential result of the temperature estimation function is closest to zero or is zero, outputting a constant resulting in the differential result as an optimized parameter.

2. The thermal estimation device of claim 1, wherein the temperature model is differentiable.

3. The thermal estimation device of claim 1, wherein the temperature model generator determines at least one grid occupied by the circuit module according to the initial coordinate of the circuit module.

4. The thermal estimation device of claim 3, wherein the temperature model generator multiplies a total power consumption of the circuit module by a proportion of an overlapping area between the circuit module and each of the at least one grid to the initial area occupied by the circuit module, to obtain the initial power consumption of the circuit module distributed on each of the at least one grid.

5. The thermal estimation device of claim 4, wherein the temperature model generator calculate a distance between the center of each of the at least one grid occupied by the circuit module and an observation point, and calculates a rate of temperature rise of each of the at least one grid to the observation point according to the distance.

6. The thermal estimation device of claim 5, wherein the temperature model generator multiplies the rate of temperature rise of each of the at least one grid to the observation point by the initial power consumption occupied by the at least one of the grid occupied, to obtain a grid temperature estimation function of each of the at least one grid, and adds up the grid temperature estimation function of each of the at least one grid to calculate the temperature estimation function of the circuit module to the observation point.

7. The thermal estimation device of claim 6, wherein when the at least one grid comprises a first grid, and the first grid comprises a portion of the circuit module and a portion of another circuit module, adding up the initial power consumption on the portion of the circuit module and another initial power consumption on the portion of another circuit module to calculate a total power consumption on the first grid, and multiplying the total power consumption by the rate of temperature rise of the first gird to the observation point to obtain the temperature estimation function caused by the total power consumption of the first grid to the observation point.

8. The thermal estimation device of claim 7, wherein the temperature model generator calculates an overlapping area of the first grid by a bell-shaped function, and the bell-shaped function is differentiable.

9. The thermal estimation device of claim 1, wherein the temperature model generator compensates for a boundary temperature of a chip by a heat source mirroring method.

10. The thermal estimation device of claim 1, wherein the temperature gradient calculator substitutes at least one of the testing area, the testing power consumption, and the testing coordinate in a form of variable into the temperature model for correspondingly estimating the temperature estimation function.

11. The thermal estimation device of claim 1, wherein the thermal sensing analyzer outputs the optimized parameter to adjust at least one of a power consumption, an area, or a layout of the circuit module of the chip.

12. A thermal estimation method, comprising: generating a temperature model according to an initial power consumption, an initial area and an initial coordination of a circuit module, wherein the temperature model is configured for describing a relation of the initial power consumption, the initial area and the initial coordination of the circuit module corresponding to a chip system temperature;
substituting at least one of a testing area, a testing power consumption or a testing coordinate of the circuit module into the temperature model for correspondingly estimating a temperature estimation function; and
differentiating the temperature estimation function, wherein when an absolute value of a differential result of the temperature estimation function resulted from a constant is closest to zero or is zero, outputting the constant as an optimized parameter.

13. The thermal estimation method of claim 12, wherein the temperature model is differentiable.

14. The thermal estimation method of claim 12, further comprising:
determining at least one grid occupied by the circuit module according to the initial coordinate of the circuit module.

15. The thermal estimation method of claim 14, further comprising:
multiplying a total power consumption of the circuit module by a proportion of an overlapping area between the circuit module and each of the at least one grid to the initial area occupied by the circuit module, to obtain the initial power consumption of the circuit module distributed on each of the at least one grid.

16. The thermal estimation method of claim 15, further comprising:
calculating a distance between the center of each of the at least one grid occupied by the circuit module and an observation point, and calculating a rate of temperature rise of each of the at least one grid to the observation point according to the distance.

17. The thermal estimation method of claim 16, further comprising:
multiplying the rate of temperature rise of each of the at least one grid to the observation point by the initial power consumption occupied by the at least one of the grid occupied, to obtain a grid temperature estimation function of each of the at least one grid, and adding up the grid temperature estimation function of each of the at least one grid to calculate the temperature estimation function of the circuit module to the observation point.

18. The thermal estimation method of claim 17, further comprising:
adding up, when the at least one grid comprises a first grid and the first grid comprises a portion of the circuit module and a portion of another circuit module, the initial power consumption on the portion of the circuit module and another initial power consumption on the portion of another circuit module to calculate a total power consumption on the first grid, and multiplying the total power consumption by the rate of temperature rise of the first gird to the observation point to obtain the temperature estimation function caused by the total power consumption of the first grid to the observation point.

19. The thermal estimation method of claim 18, further comprising:
calculating an overlapping area of the first grid by a bell-shaped function, and the bell-shaped function is differentiable.

20. The thermal estimation method of claim 12, further comprising:
compensating for a boundary temperature of a chip by a heat source mirroring method.

21. The thermal estimation method of claim 12, further comprising:
substituting at least one of the testing area, the testing power consumption, and the testing coordinate in a form of variable into the temperature model for correspondingly estimating the temperature estimation function.

22. The thermal estimation method of claim 12, further comprising:
outputting the optimized parameter to adjust at least one of a power consumption, an area, or a layout of the circuit module of the chip.

* * * * *